United States Patent [19]

Urano et al.

[11] 4,212,525

[45] Jul. 15, 1980

[54] RELEASE DEVICE IN A CAMERA HAVING A MOTOR DRIVE UNIT

[75] Inventors: Fumio Urano, Omiya; Akihiro Arai, Urawa; Takumi Kobayashi; Eiji Yamamori, both of Tokyo; Junji Umetsu, Kita, all of Japan

[73] Assignee: Asahi Kogaku Kogyo Kabushiki Kaisha, Tokyo, Japan

[21] Appl. No.: 906,511

[22] Filed: May 16, 1978

[30] Foreign Application Priority Data

May 23, 1977 [JP] Japan .................................. 52-59582

[51] Int. Cl.² .......................... G03B 1/18; G03B 17/38
[52] U.S. Cl. ..................................... 354/173; 354/266
[58] Field of Search ............... 354/170, 171, 173, 266, 354/268

[56] References Cited

U.S. PATENT DOCUMENTS

| | | | |
|---|---|---|---|
| 3,800,310 | 3/1974 | Umeda | 354/171 |
| 3,930,263 | 12/1975 | Urano | 354/268 |
| 3,938,169 | 2/1976 | Kitai | 354/268 |
| 4,024,553 | 5/1977 | Maitani et al. | 354/268 X |

Primary Examiner—Donald A. Griffin
Attorney, Agent, or Firm—Sughrue, Rothwell, Mion, Zinn and Macpeak

[57] ABSTRACT

In a camera having both a mechanical release and a motor drive release, the motor drive unit is provided with a cam which, when the motor drive unit is actuated, limits the movement of the mechanical release member to an amount sufficient only to trip a motor energizing switch without mechanically releasing the curtains. In this way, the same release lever can be used for both the mechanical and motor drive release operations.

3 Claims, 6 Drawing Figures

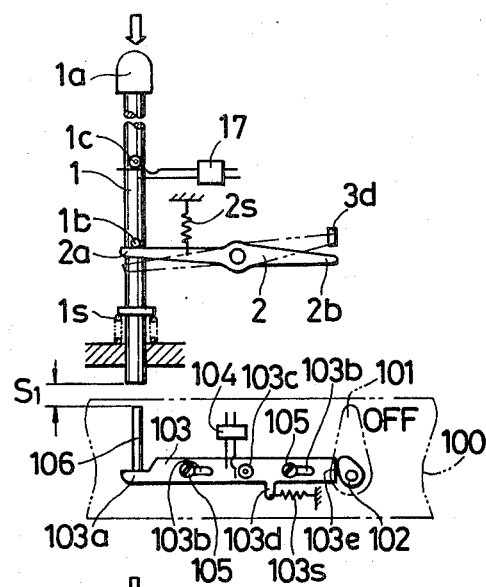
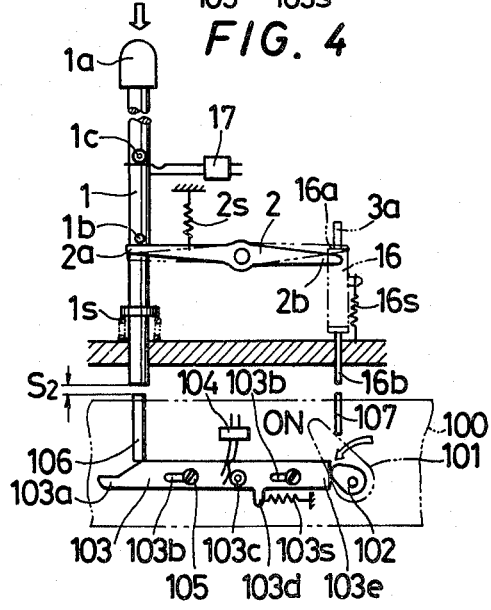

RELEASE DEVICE IN A CAMERA HAVING A MOTOR DRIVE UNIT

BACKGROUND OF THE INVENTION

This invention relates to a release device in a camera having a motor drive unit which can be triggered by the use of the release operation member (such as, for instance, the release button of the camera).

Heretofore, with a camera in which a motor drive unit is built or for which one is detachably provided, triggering the motor drive unit is, in general, carried out by means of a triggering member which is provided separately from the ordinary release member. With such an arrangement, two operating members for release operation are provided and, accordingly, there may be a good chance of erroneously operating the wrong one of the two operating members. Furthermore, the feeling and time lag with which the operator is familiar with the ordinary release operation are changed during the motor drive operation. Thus, such an arrangement is unsatisfactory.

On the other hand, with a camera having a so-called electromagnetic release system recently proposed in which the release drive is effected by means of an electromagnet, the release operation is not mechanically controlled by the mechanism of the camera and, therefore, a motor drive unit can by employed for the winding operation in such a manner that the release operation is carried out by the camera while the winding operation is carried out by the motor drive unit so that both the ordinary photographing operation and the motor-drive photographing operation can be effected by operating the same release member. In this respect, the camera of this type is advantageous. However, the camera is still disadvantageous in that when the battery in the camera is discharged, no further photographing operation can be performed.

SUMMARY OF THE INVENTION

Accordingly, an object of this invention is to eliminate the above-described difficulties accompanying a conventional camera. More specifically, an object of the invention is to provide a release device in a camera in which the release operations in an ordinary photographing operation and a motor-drive photographing operation can be effected with one and the same release operation member. This is accomplished by providing a motor drive unit with a cam which will limit the movement of the release operation member when the motor drive mode of operation is desired. An electric switch is actuated by the release operation member and when the motor drive is actuated this switch will energize the motor. The switch is positioned to be tripped before the mechanical release is effected by the release operation member so that by limiting the movement of the latter to only an amount sufficient to trip the motor energizing switch, motor operation is achieved and when mechanical operation is desired the travel of the release operation member is not limited by the motor drive unit cam. In this way, both the mechanical and motor drive modes of release can be controlled by a single member.

BRIEF DESCRIPTION OF THE DRAWINGS

FIG. 3 is an explanatory diagram showing the on-off operation member of a motor drive unit, which is in an "off" state.

FIG. 4 is an explanatory diagram showing the on-off operation member of the motor drive unit, which is in an "on" state.

DETAILED DESCRIPTION OF THE INVENTION

Figure 1:
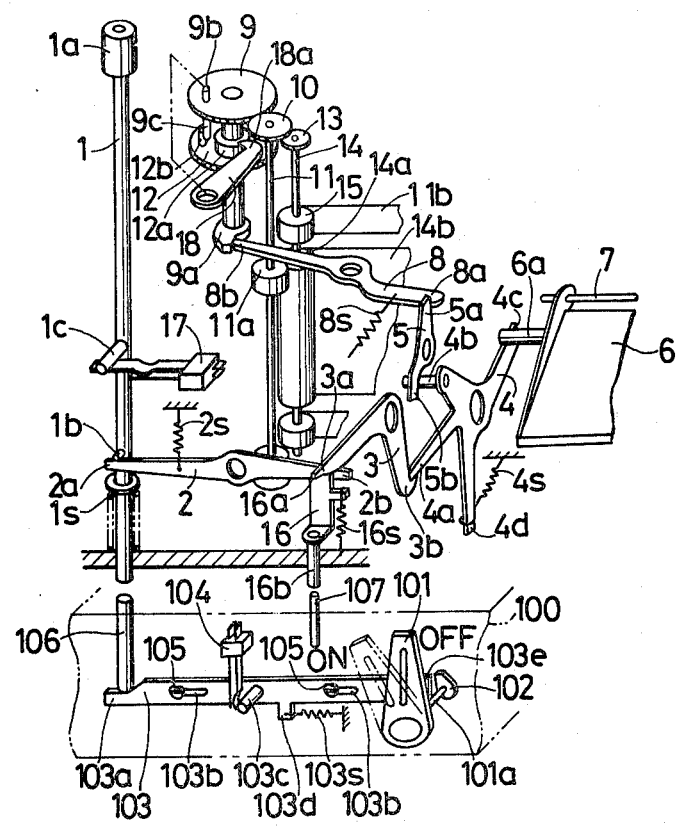
FIG. 1 is a perspective view illustrating the state of a release device according to this invention before the release operation.
Figure 2:
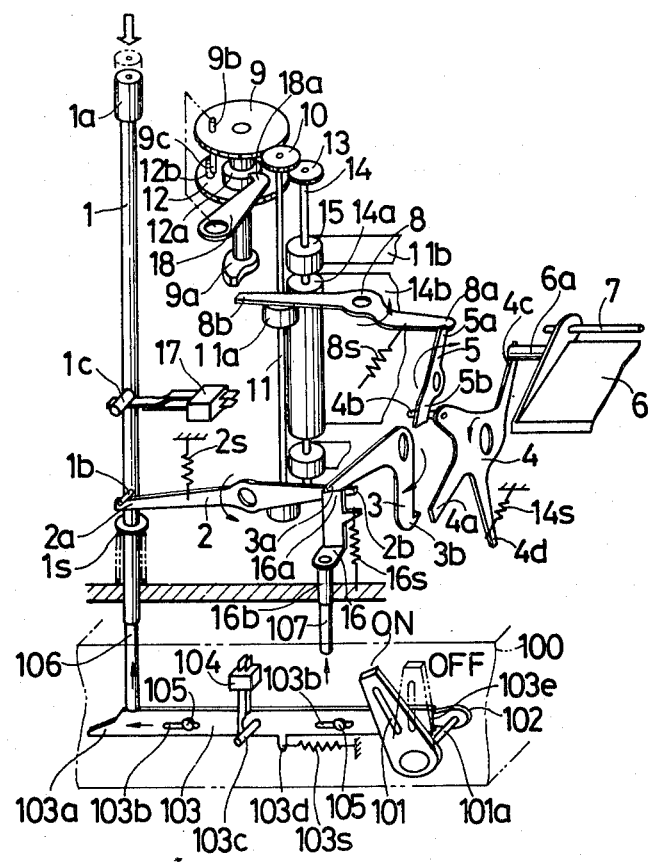
FIG. 2 is also a perspective view showing the state of the release device after the motor release operation.

This invention will be described with reference to its preferred embodiment shown in FIGS. 1 and 2 which are perspective views illustrating a release device according to the invention. FIG. 1 shows the state of the release device before release, while FIG. 2 shows the state of the release device after release. Referring to FIG. 1, reference numeral 1 designates a release rod, and a release operating member 1a provided outside the camera is fixedly secured to the release rod 1. Reference numerals 2 and 3 designate a release relay lever and a mirror locking lever, respectively. One end portion 2a of the release relay lever 2 is engaged with a pin 1b embedded in the release rod 1, while the other end portion 2b of the release relay lever 2 is engaged with one end portion 3a of the mirror locking lever 3. A hook section 3b of the mirror locking lever 3 serves to lock a hook section of a mirror driving lever 4 against the elastic force of a spring 4s. A pin 4b is adapted to engage the lower end portion 5b of a top curtain release lever 5, while one end portion 4c is adapted to engage a pin 6a integral with a mirror 6 which is supported on a shaft 7. The upper end portion 5a of the top curtain release lever 5 is so arranged as to strike the rear end portion 8a of a top curtain locking lever 8, while the front end portion 8b of the lever 8 serves to lock a locking section 9a which is fixedly provided below a top curtain interlocking gear 9. A pinion 10 engages the top curtain interlocking gear 9, and it is integral with the shaft 11 of a top curtain ribbon 11b and a ribbon winding shaft 11a. In other words, the interlocking gear 9, the pinion 10, and the ribbon winding shaft 11a are interlocked. Reference numeral 12 designates a bottom curtain interlocking gear, and its hook section 12a is locked by the hook section 18a of a bottom curtain locking lever 18. The aforementioned top curtain interlocking gear 9 is interlocked with a winding mechanism not shown in the figure, and a pin 9c embedded in the interlocking gear is turned together with a pin 12b embedded in the bottom curtain interlocking gear 12 by the winding operation. Reference numeral 13 designates a bottom curtain pinion which is integral with the shaft 14 of a bottom curtain 14b and a winding shaft 14a. Reference numeral 15 designates the roller of the top curtain ribbon 11b. Shown in FIG. 1 is a state of the device after the completion of the winding operation but before the release operation.

When the release operating member 1a is depressed downwards with the index finger, for instance, against the elastic force of the spring 1s, the pin 1b pushes the one end portion 2a of the release relay lever 2, as a result of which the lever 2 is turned counterclockwise.

At the same time, the other end portion 2b of the lever 2 pushes the end portion 3a of the mirror locking lever 3 upwards, as a result of which the mirror locking lever 3 is turned clockwise. When the hook section 3b is disengaged from the hook section 4a of the mirror drive lever 4, the mirror drive lever 4 is turned counterclockwise by means of the strong spring 4s, and therefore the portion 4c thereof operates the fixed pin 6a, as a result of which the mirror 6 is turned about the mirror shaft 7; that is, the mirror 6 is moved upwards. At the end of this operation, the pin 4b on the mirror drive lever strikes the top curtain release lever 5, and therefore the top curtain locking lever 8 is turned counter clockwise. Thus, the state shown in FIG. 2 is obtained.

As a result, the top curtain system is released to expose the film to light by means of a spring (not illustrated) because the winding mechanism has been disengaged from the top curtain interlocking gear 9 during the initial release operation. During the operation described above, the pin 9b of the top curtain drive gear 9 operates a bottom curtain control member, which is not shown since it is very well known in the art, which strikes the bottom curtain locking lever 18, and releases the bottom curtain. The bottom curtain system operates to suspend the film exposure with the aid of a spring (not shown). At the completion of the operation of the bottom curtain, the return release of the mirror device is effected, and the mirror 6 is moved downward again.

The action sequence from the release to the completion of exposure, which is well known in the art, is as described above. In this invention, the camera is provided with a motor drive unit 100 detachably or undetachably, which is coupled to the above-described release device.

A motor release member 16 is coupled to the motor drive unit 100 with a pin 16b fixedly secured to the member 16, and it is biased downwardly. A switch 17 is used to trigger the motor drive unit 100, and it is operated by the vertical operation of a member 1c which is secured to the release rod 1 through an insulator. Reference numeral 101 designates the on-off operation member of the motor drive unit 100, which is integral through its shaft 101a with a release stroke switching cam 102. Reference numeral 103 designates a release stroke regulating member which is biased in the right-hand direction by means of a spring 103s hooked on a protrusion 103d at all times. The left end portion 103a of the release stroke regulating member 103 forms a step cam. The release stroke regulating member 103 is allowed to assume the left and right positions by means of the release stroke switching cam 102. When the on-off operation member 101 is at the OFF position, a release stroke regulation interlocking pin 106 takes the lower position; and when the member 101 is at the ON position, the interlocking pin 106 takes the upper position. In this manner, the positions of the interlocking pin 106 are switched with the aid of the step cam formed at the end portion of the release stroke regulating member.

The interlocking pin 106 is so designed as to couple to the lower end portion of the release rod 1. However, when the interlocking pin 106 is at the lower position, the downward operating stroke of the release rod 1 is not limited, but when the pin 106 is at the upper position, the downward operating stroke of the release rod 1 is limited to a set value. Reference numeral 105 is intended to designate guide pins utilized when the release stroke regulating member 103 is moved horizontally, as viewed in the figure, by the cam 102. Those guide pins 105 are inserted into grooves 103b formed in the release stroke regulating member 103. Reference numeral 104 designates the power switch of the motor drive unit, which is closed when an insulating member 103c on the regulating member 103 is moved to the left, to thereby energize a motor drive circuit (not shown). In other words, when the state of the on-off operation member 101 is changed from the OFF state to the ON state, the downward stroke of the release operating member 1a being depressed is limited and, therefore, upon closure of the power switch 104 the motor drive circuit is operated.

Referring to FIG. 3, when the on-off operation member 101 is in the OFF state, the release stroke is as indicated by S1 in the figure. When the release operating member 1a provided outside the camera is depressed in the direction of the arrow with the index finger, for instance, the release relay lever 2 is turned counterclockwise against the elastic force of the springs 2s with the aid of the pin 1b, and finally the lever 2 is moved as indicated by the two-dot chain line. As a result, the mirror locking lever 3 is turned so that the mirror drive lever 4 is turned from its locking position to its release position, thereby completing the release.

On the other hand, when the on-off operation member 101 is in the ON state as shown in FIG. 4 (where the power switch 104 has been closed), the release operation stroke is limited to a value S2 as indicated in FIG. 4. Therefore, even if the release operating member 1a is depressed in the direction of the arrow, it is impossible to turn the release relay member 2 further than the position indicated by the two-dot chain line in FIG. 4; that is, the locking of the mirror drive lever 4 by the mirror locking lever 3 cannot be released. However, at the end of the release operation stroke S2, the trigger switch 17 is closed to trigger the motor drive circuit (not shown). As a result, a motor release pin 107 is moved upward by the motor or the electromagnet, the motor release member 16 is moved upward against the elastic force of the spring 16s, and the upper end portion of the member 16 strikes the end 3a of the mirror locking lever 3, to thereby release the locking of the mirror drive lever 4.

As is apparent from the above description, in this invention, when the on-off operation member of the motor drive unit is in the ON state, the release operation stroke is limited to the value S2 from the value S1, at which stroke the mirror locking is released by the release operation effected by the motor. Therefore, the release operating member can be commonly used for the ordinary photographing operation and the motor-drive photographing operation. This is considerably advantageous in operability. Furthermore, as the release by the motor is merely for releasing the mirror locking, the release power can be small, which will advantageously minimize the noise and the camera blur which may be caused when the motor drive unit is operated.

Figure 5:
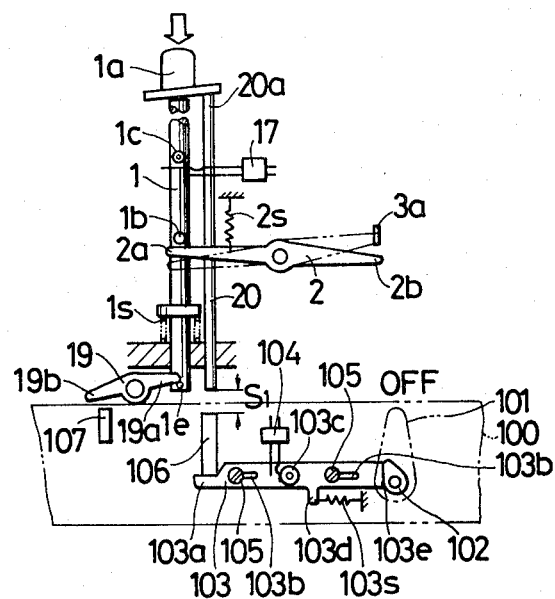
FIG. 5 is an explanatory diagram showing a modification of a release regulating system in FIG. 3.
Figure 6:
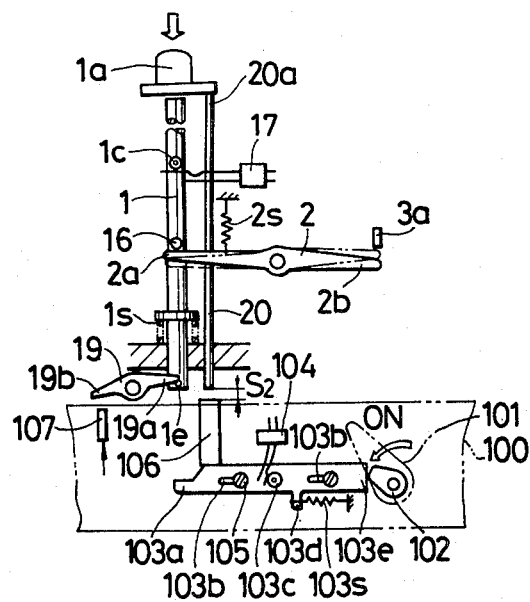
FIG. 6 is an explanatory diagram showing a modification in which a motor release member adapted to strike a mirror locking member in FIG. 4 is modified so as to strike a release rod.

In the embodiments shown in FIGS. 3 and 4, the mirror locking lever is subjected to motor release. On the other hand, shown in FIGS. 5 and 6 are embodiments of the invention in which the release rod 1 is directly operated by the motor release. In the case of the motor drive operation, a motor release lever 19 is, as shown in FIG. 6, additionally provided. When the motor release pin 107 is moved upwards (in the direction of the arrow), it strikes one end 19b of the motor release lever 19 thereby to turn the lever 19 clockwise, as a result of which the other end 19a of the lever 19 moves the release rod 1 downward by means of a pin 1e additionally provided on the release rod 1; that is, the rod 1 is operated in such a manner that the release relay lever 2 shown in FIG. 6 is moved from the position indicated by the two-dot chain line to the position where the mirror locking is released. The release operating member 1a is provided separately from the release rod so that the latter may move downwardly independent of the former. Therefore, when the upper end 20a of a release stroke regulating pin 20, which is additionally provided for the flange section of the release operating member 1a, is pressed downwardly by the release operating member 1a, the stroke is limited to the value S2 shown in FIG. 6 from the value S1 shown in FIG. 5 by the interlocking pin 106. The description of the operations of the other componnets is omitted because they are similar to those described above. However, in this case, the release operating member 1a is depressed by the index finger, but it is detained when it covers the stroke S2, and thereafter the release rod 1 is moved downwards by the motor until it covers the stroke S1. As a result, the release tension generated by the motor is released, and thereafter the release rod 1 is moved upwards by means of the restoring spring 1s (whose elastic force is, in general, relatively strong).

What is claimed is:

1. A shutter release device for a camera having a camera release actuating member movable by the camera operator to mechanically actuate said release device and a motor drive unit for actuating said release device when energized, wherein the improvement comprises:
    a control member in said motor drive unit movable between a first position in which said motor drive unit is disabled and a second position in which said motor drive unit is enabled;
    switch means operable by said release member during movement of said release actuating member by said operator, said switch means being positioned to be switched prior to mechanical actuation of said release device by said release actuating member and to thereby energize said motor drive unit when the latter is enabled;
    said control member in its first position permitting said release actuating member to travel a sufficient amount to mechanically actuate said release device and in its second position limiting the travel of said release actuating member to an amount sufficient to switch said switch means but insufficient to mechanically actuate said release device, whereby said release actuating member may mechanically actuate said release device and energize said motor drive unit when said control member is in its first and second positions, respectively.

2. A shutter release device according to claim 1, wherein said release actuating member comprises an operating member movable by said operator and a release rod movable by said operating member to actuate said release device, said control member limits the travel of said operating member when the motor drive unit is enabled and said motor drive unit, when energized, moves said control member an amount sufficient to actuate said release device.

3. A shutter release device according to claim 1, wherein said release device includes a locking member for preventing a camera operation such as a mirror movement or lens stop operation and wherein said motor drive unit, when energized, acts directly on said locking member to release said locking member.

* * * * *